United States Patent
Fujiwara et al.

(10) Patent No.: US 10,535,860 B2
(45) Date of Patent: Jan. 14, 2020

(54) NONAQUEOUS ELECTROLYTE SECONDARY BATTERY

(71) Applicant: Panasonic Corporation, Osaka (JP)

(72) Inventors: Isao Fujiwara, Hyogo (JP); Hiromasa Yagi, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 387 days.

(21) Appl. No.: 15/210,882

(22) Filed: Jul. 14, 2016

(65) Prior Publication Data

US 2017/0077485 A1 Mar. 16, 2017

(30) Foreign Application Priority Data

Sep. 16, 2015 (JP) .................. 2015-183248

(51) Int. Cl.
| | |
|---|---|
| *H01M 2/34* | (2006.01) |
| *H01M 2/26* | (2006.01) |
| *H01M 2/04* | (2006.01) |
| *H01M 2/30* | (2006.01) |
| *H01M 2/02* | (2006.01) |

(52) U.S. Cl.
CPC ......... *H01M 2/345* (2013.01); *H01M 2/0217* (2013.01); *H01M 2/0285* (2013.01); *H01M 2/0404* (2013.01); *H01M 2/0486* (2013.01); *H01M 2200/20* (2013.01)

(58) Field of Classification Search
CPC ........... H01M 2200/20; H01M 2/0217; H01M 2/0285; H01M 2/0404; H01M 2/0486; H01M 2/345
See application file for complete search history.

(56) References Cited

U.S. PATENT DOCUMENTS 5,691,073 A * 11/1997 Vu .................. H01H 37/043
429/170
2001/0027807 A1* 10/2001 Morishita ........... H01M 2/1241
137/68.27

(Continued)

FOREIGN PATENT DOCUMENTS

| JP | 8-115714 A | 5/1996 |
|---|---|---|
| JP | 2000-508468 A | 7/2000 |

(Continued)

*Primary Examiner* — Adam A Arciero
(74) *Attorney, Agent, or Firm* — McDermott Will & Emery LLP

(57) ABSTRACT

A nonaqueous electrolyte secondary battery includes a conductive outer can, an electrode body in the outer can, a conductive seal plate tightly closing an open end of the outer can, and a cathode external terminal on the seal plate. The battery further includes a current cutoff mechanism (CID). The CID is located on the electrical conduction pathway between the cathode external terminal and the electrode body and interrupts the electrical coupling therebetween in response to an increased internal pressure in the battery. The CID includes a thin portion of the seal plate and a diaphragm. The diaphragm deforms to interrupt the electrical coupling between the cathode external terminal and the electrode body in response to the increase in the internal pressure in the battery. A cathode collector lead electrically couples the electrode body and the seal plate, and the seal plate connects the diaphragm and the cathode collector lead.

4 Claims, 8 Drawing Sheets

(56) References Cited

U.S. PATENT DOCUMENTS

| | | | |
|---|---|---|---|
| 2011/0206958 A1 | 8/2011 | Kiyama et al. | |
| 2011/0244280 A1* | 10/2011 | Byun | H01M 2/0404 429/61 |
| 2014/0113164 A1 | 4/2014 | Nagata | |
| 2015/0171411 A1* | 6/2015 | Kobayashi | H01M 2/22 429/61 |

FOREIGN PATENT DOCUMENTS

| | | |
|---|---|---|
| JP | 2009-110808 | 5/2009 |
| JP | 2010-113929 A | 5/2010 |
| JP | 2013-041839 | 2/2013 |
| JP | 2014-086177 | 5/2014 |
| WO | 2015/079672 A1 | 6/2015 |

* cited by examiner

NONAQUEOUS ELECTROLYTE SECONDARY BATTERY

BACKGROUND

1. Technical Field

The present disclosure relates to a nonaqueous electrolyte secondary battery.

2. Description of the Related Art

Some nonaqueous electrolyte secondary batteries incorporate a current cutoff mechanism (CID), a mechanism that detects an overcharged state and interrupts the current. In a typical configuration of a battery that has a CID, an outer can that houses an electrode body and a seal plate joined to an open end of the outer can are electrically isolated from the electrode body (refer to Japanese Patent No. 5582182 and Japanese Unexamined Patent Application Publication No. 2014-86177).

SUMMARY

Applying external stress to a fully charged nonaqueous electrolyte secondary battery may cause an internal short circuit that leads to an increase in battery temperature.

In configurations like those disclosed in the above two publications, the outer can and the seal plate are not in electrical contact with the electrode body. When a short circuit occurs in such a battery, thus, short-circuit current flows inside the electrode body. Joule heat generated at the point of the short circuit can drive the cathode active material and the nonaqueous electrolyte to react, potentially leading to an abrupt increase in battery temperature.

In one general aspect, the techniques disclosed here feature a nonaqueous electrolyte secondary battery. The nonaqueous electrolyte secondary battery includes a conductive outer can, an electrode body in the outer can, a conductive seal plate tightly closing an open end of the outer can, and an external terminal on the seal plate. The battery further includes a current cutoff mechanism. The current cutoff mechanism is located at any point on an electrical conduction pathway between the external terminal and the electrode body and interrupts electrical coupling therebetween in response to an increase in an internal pressure in the battery. The current cutoff mechanism includes a thin portion of the seal plate and a diaphragm. The diaphragm deforms to interrupt the electrical coupling between the external terminal and the electrode body in response to the increase in the internal pressure in the battery. The electrode body and the seal plate are electrically coupled by a collector lead, and the diaphragm and the collector lead are connected by the seal plate.

The present disclosure provides a nonaqueous electrolyte secondary battery that is unlikely to heat abruptly and therefore is highly reliable.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 11:
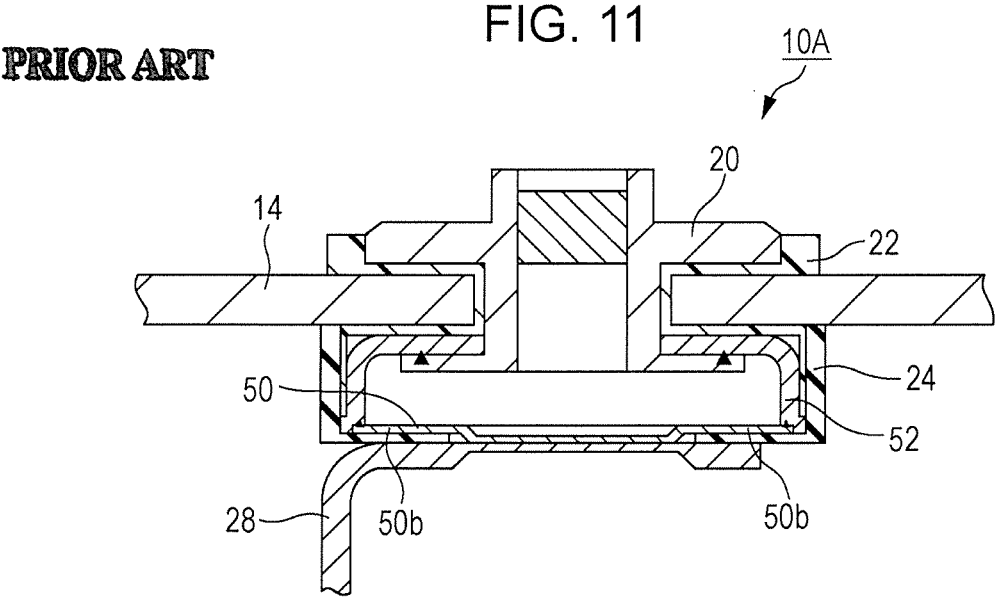
FIG. 11 illustrates a known CID.

The constitution of a nonaqueous electrolyte secondary battery includes an electrode body and a nonaqueous electrolyte (electrolytic solution) housed in an outer can and a seal plate joined to an open end of the outer can. The electrode body is composed of a cathode and an anode each having a core and an active material layer on the core. The seal plate holds external terminals. In addition to these, a current cutoff mechanism (CID) is provided at any point on the electrical conduction pathway between one of the external terminals and the electrode body. As illustrated in FIG. 11 (described hereinafter), the CID includes, for example, a seal lead and a diaphragm. The seal lead has a cylindrical opening on the electrode body side. The diaphragm tightly closes the cylindrical opening and, in response to an increase in the internal pressure in the battery, deforms to interrupt the electrical coupling between the electrode body and the seal lead. The seal lead is on the electrode body side of the seal plate in order to house the diaphragm and allow the diaphragm to deform in response to an increase in the internal pressure in the battery.

CIDs, installed in batteries as a countermeasure against overcharging, interrupt the current when the internal pressure in the batteries exceeds a predetermined limit. In an overcharged battery, components of the electrolytic solution, such as a nonaqueous solvent, are electrolyzed, and a gas is generated. In response to the generation of the gas, the diaphragm of the CID deforms to interrupt the conduction pathway between an external terminal and the electrode body. As a result, any further overcharging is prevented.

In a typical configuration of a battery having a CID, the outer can, in which the electrode body is housed, and the seal plate, which is joined to an open end of the outer can, are not in electrical connection with the electrode body as disclosed in the above patent publications.

Nonaqueous electrolyte secondary batteries can heat spontaneously in some cases. In particular, an internal short circuit caused by external stress applied to a fully charged battery makes the battery release a large amount of energy instantly and therefore often leads to an abrupt increase in battery temperature. Examples of causes of internal short circuits include perforation with a pointed piece of metal (e.g., a nail), crushing of the battery, and drop impact. Among these, perforation with a pointed piece of metal leads to an internal short circuit that generates a large quantity of Joule heat at the point of the short circuit (in particular, in the vicinity of the cathode core). The great Joule heat can drive the cathode active material and the nonaqueous electrolyte to react, potentially leading to an abrupt increase in battery temperature.

After extensive research to solve this problem, the inventor found that if a nonaqueous electrolyte secondary battery with a CID has a diaphragm and a collector lead with the seal plate therebetween, the outer can and the electrode body can be electrically coupled, and based on these findings the inventor devised this embodiment. In this embodiment, a circuit is formed for current to flow from the electrode body to the outer can. The circuit directs the short-circuit current that occurs in association with an internal short circuit from the electrode body to the outer can, limiting the increase in temperature at the point of the short circuit. As a result, an abrupt increase in battery temperature is prevented.

The following describes the details of an example of an embodiment with reference to drawings. The drawings referenced in the description of the embodiment are schematics, and the relative dimensions and other details of the illustrated components are not necessarily to scale. The following description should be considered when any specific relative dimensions or other details of a component are determined.

Figure 1:
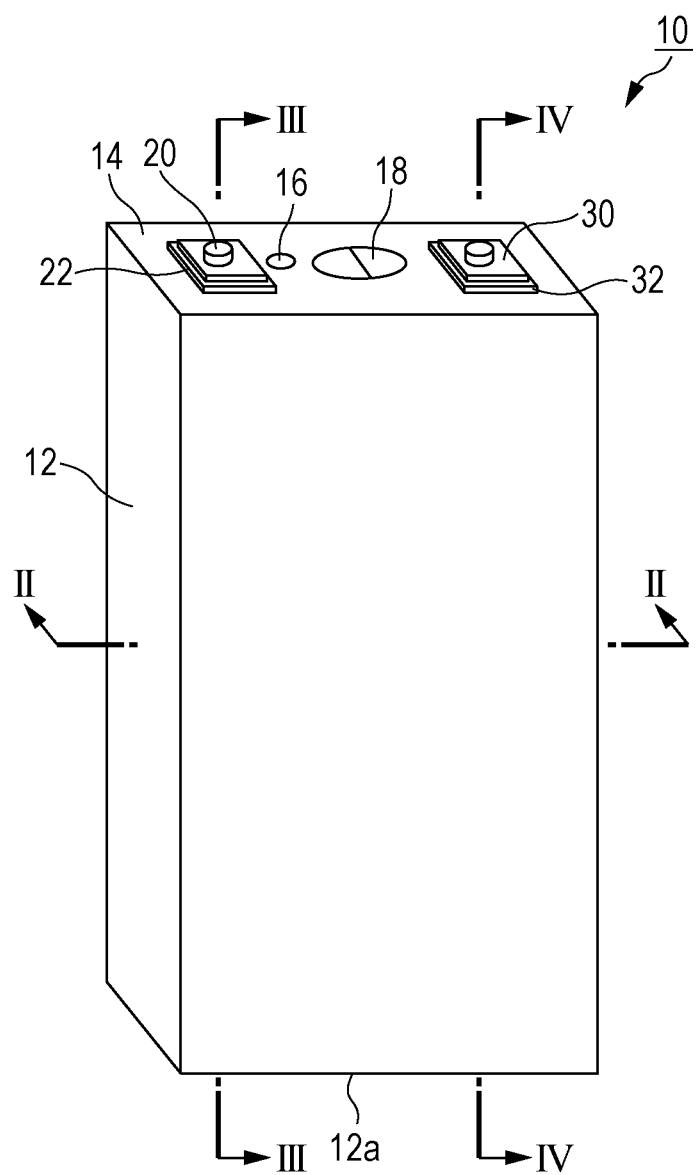
FIG. 1 is a perspective view of a nonaqueous electrolyte secondary battery as an example of an embodiment.
Figure 2:
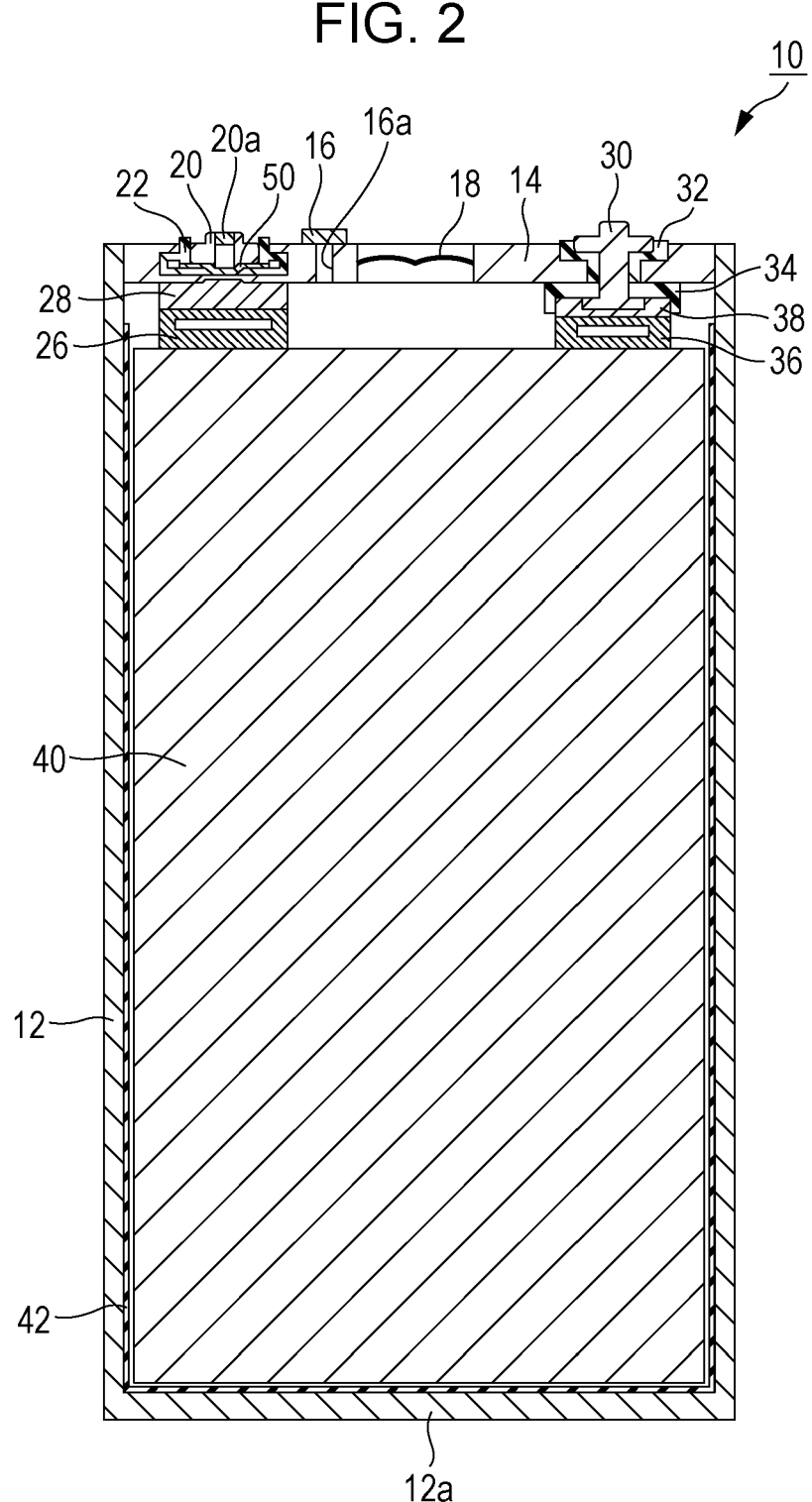
FIG. 2 is a cross-section taken along line II-II in FIG. 1.

FIG. 1 is a perspective view of a nonaqueous electrolyte secondary battery 10 as an example of an embodiment. FIG. 2 is a cross-section taken along line II-II in FIG. 1. The nonaqueous electrolyte secondary battery 10 includes an outer can 12 and a seal plate 14. The outer can 12 is bottomed and has an opening, and the seal plate 14 tightly closes this opening. The outer can 12 is a bottomed tube-like rectangular container in which an electrode body 40 is housed with an electrolytic solution. The electrode body 40 is composed of a cathode and an anode each having a core and an active material layer on the core. The outer can 12 has a bottom 12a, and the opening is positioned to face the bottom 12a. The seal plate 14, tightly closing the outer can 12 like a lid, holds a stopper 16, a gas outlet valve 18, a cathode external terminal 20, and an anode external terminal 30. The stopper 16 seals an injection hole 16a through which the electrolytic solution is injected. The gas outlet valve 18 is used to discharge the gas in the battery to the outside of the battery and operates at a pressure higher than the pressure at which a CID (described hereinafter) operates. The outer can 12 and the seal plate 14 are desirably made of a metal that is conductive and stable at the potentials of the cathode. For example, these components can be made of aluminum or an aluminum alloy.

The cathode external terminal 20 provides electrical contact between an external power supply and the cathode. The anode external terminal 30 provides electrical contact between the external power supply and the anode. As illustrated in FIG. 2, the cathode external terminal 20 has a plug 20a. When the outer can 12 cannot withstand the pressure of a gas generated therein, the plug 20a is pushed out of the cathode external terminal 20 to let the gas out.

The cathode external terminal 20 is on the seal plate 14 but is electrically isolated from the seal plate 14 by an insulating gasket 22. The anode external terminal 30 is on the seal plate 14 but is electrically isolated from the seal plate 14 by an insulating gasket 32 and an anode insulator 34. It is desired that the gaskets 22 and 32 and the anode insulator 34 be made of resin.

As illustrated in FIG. 2, the outer can 12 houses the electrode body 40. The electrode body 40 is housed with its sides and bottom covered with an insulating sheet 42. The insulating sheet 42 is desirably in the shape of, for example, a folded box that fits in the inner walls of the outer can 12 or a bag that covers the electrode body 40.

There is a cathode tab 26 at one end of the seal plate 14 side of the electrode body 40 and an anode tab 36 at the other end of the seal plate 14 side. A cathode collector lead 28 is joined to the cathode tab 26. An anode collector lead 38 is joined to the anode tab 36. The cathode collector lead 28 is electrically coupled to the cathode external terminal 20 with the seal plate 14 and a diaphragm 50 therebetween. The anode collector lead 38 is electrically coupled to the anode external terminal 30.

Figure 3:
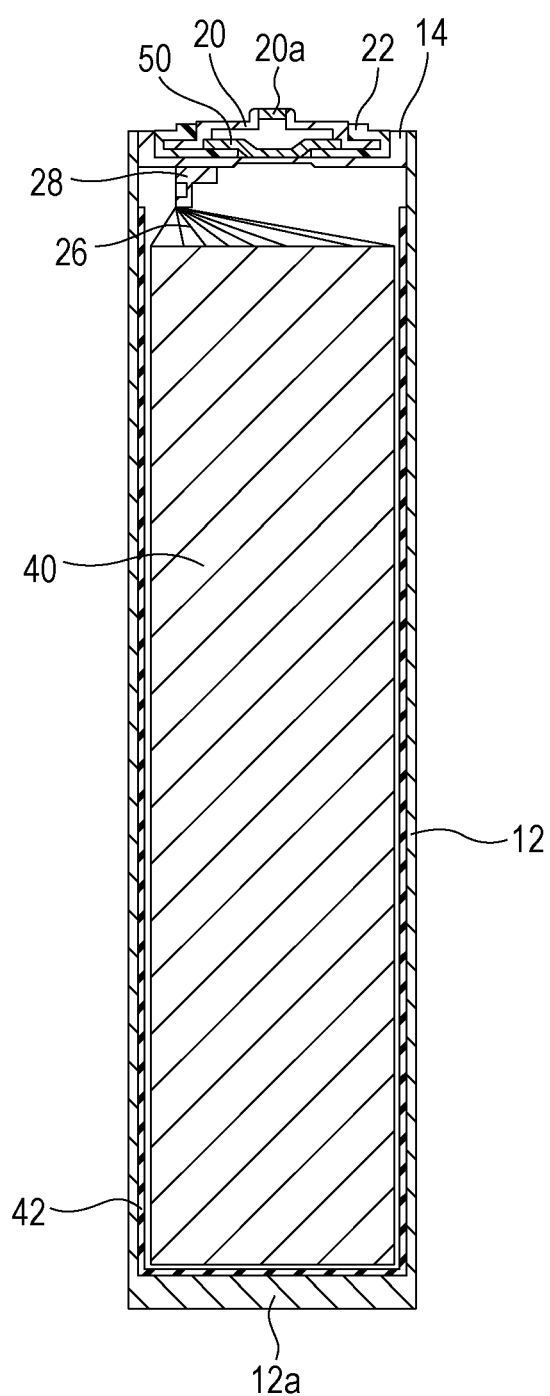
FIG. 3 is a cross-section taken along line III-III in FIG. 1.

FIG. 3 is a cross-section taken along line III-III in FIG. 1. As illustrated in FIG. 3, at the cathode, a cathode tab 26 is joined to the cathode collector lead 28. Although in FIG. 3 the cathode tab 26 and the cathode collector lead 28 are joined together at one point, there may be two or more junctions. For example, the use of two junctions leads to reduced variations in length between the layers of the cathode tab 26. There may be another conductive member that is connected to the cathode tab 26 and joins it to the cathode collector lead 28.

Figure 4:
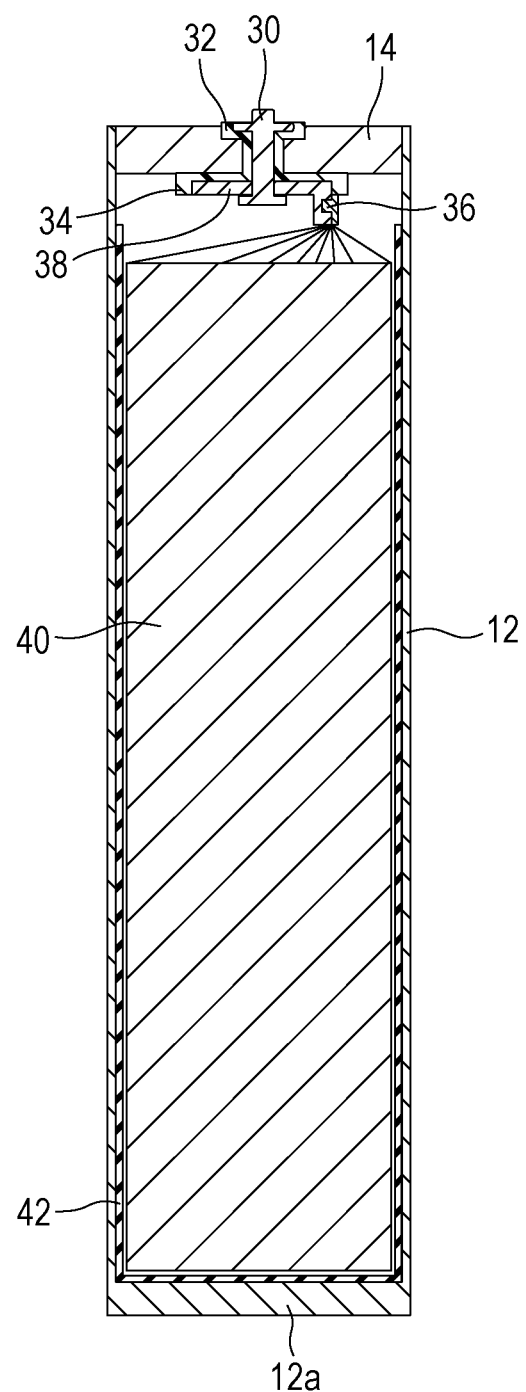
FIG. 4 is a cross-section taken along line IV-IV in FIG. 1.

FIG. 4 is a cross-section taken along line IV-IV in FIG. 1. As illustrated in FIG. 4, at the anode, an anode tab 36 is joined to the anode collector lead 38. In the same way as at the cathode, there may be two or more junctions between the anode tab 36 and the anode collector lead 38, although in FIG. 4 they are joined together at one point. For example, the use of two junctions leads to reduced variations in length between the layers of the anode tab 36. There may be another conductive member that is connected to the anode tab 36 and joins it to the anode collector lead 38.

The cathode is composed of, for example, a cathode core, such as a metal foil, and a cathode active material layer on the cathode core. The cathode core can be, for example, a foil of a metal that is stable at the potentials the cathode can have, desirably aluminum (Al) or an aluminum alloy, or a film with a layer of such a metal on its surface. Desirably, the cathode core is made from a mixture of iron in aluminum. It would be desired that the iron content of the cathode core be 1.20% by weight or more and 1.7% by weight or less. The use of a cathode core made from a mixture of iron in aluminum with the iron content in this range allows the manufacturer to improve the elongation of the cathode by the heating performed during the production of the cathode and thereby to prevent a fracture due to a lack of elongation from occurring after an internal short circuit. The cathode active material layer, which contains, for example, materials such as a conductive agent and a binder in addition to a cathode active material, is obtained by applying a mixture of the materials in a suitable solvent to the cathode core, drying the resulting coating, and then rolling the cathode core.

The cathode active material is in the shape of particles and can be, for example, a transition metal oxide that contains an alkali metal or has part of its transition metal substituted with any other element. The alkali metal can be, for example, lithium (Li) or sodium (Na), desirably lithium. The cathode active material may contain at least one selected from a group including scandium (Sc), manganese (Mn), iron (Fe), cobalt (Co), nickel (Ni), copper (Cu), and yttrium (Y). Desired of these transition metals are Mn, Co, Ni, and so forth. The at least one transition metal may be substituted in part with at least one selected from a group including magnesium (Mg), aluminum (Al), lead (Pd), antimony (Sb), and boron (B). Desired of these substituting elements are Mg, Al, and so forth.

Specific examples of such cathode active materials include lithium-containing transition metal oxides such as $LiCoO_2$, $LiNiO_2$, $LiMn_2O_4$, $LiMnO_2$, $LiNi_{1-y}Co_yO_2$ ($0<y<1$), $LiNi_{1-y-z}Co_yMn_zO_2$ ($0<y+z<1$), and $LiFePO_4$. Cathode active materials can be used alone, and a combination of two or more can also be used.

The conductive agent is a conductive material in the form of, for example, a powder or particles and makes the cathode active material layer more conductive to electrons. The conductive agent is, for example, a conductive carbon material, metallic powder, or organic material. Specific examples include acetylene black, Ketjenblack, and graphite as carbon materials, a powder of aluminum as a metal powder, and phenylene derivatives as organic materials. These conductive agents can be used alone, and a combination of two or more can also be used.

The binder maintains good contact between the cathode active material and the conductive agent and improves the adhesion of the cathode active material and other materials to the surface of the cathode core. The binder can be a material such as a fluoropolymer or a rubber-like polymer. Specific examples include polytetrafluoroethylene (PTFE), polyvinylidene fluoride (PVdF), and their altered forms as fluoropolymers and ethylene-propylene-isoprene copolymers and ethylene-propylene-butadiene copolymers as rubber-like polymers. The binder may be used in combination with a thickener such as carboxymethyl cellulose (CMC) or polyethylene oxide (PEO).

A process for the production of the cathode can be, for example, as follows. First, a cathode slurry is prepared that contains lithium cobalt oxide as a cathode active material, polyvinylidene fluoride (PVdF) as a binder, a carbon material as a conductive agent, and N-methylpyrrolidone (NMP). The cathode slurry is applied to both faces of a cathode core having a thickness of, for example, 15 μm, and the applied coating is dried. This gives a cathode composed of a cathode core and a cathode active material layer on each face thereof. The resulting cathode is, for example, heated with a 280° C. low-humidity hot air with a dew point of −30° C. for 20 seconds. The cathode is then rolled to spread the cathode active material layers to a predetermined thickness and then cut into a predetermined shape.

Figure 5A:
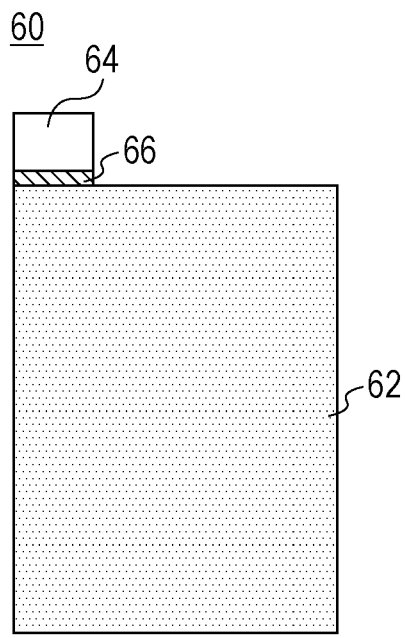
FIG. 5A is a plan view of a cathode according to an embodiment.

FIG. 5A is a plan view of a cathode 60 that has been cut out. As illustrated in FIG. 5A, the cathode 60 has a rectangular region in which a cathode active material layer 62 extends on each face of a cathode core, with a core-exposing section 64 at one end of a short side of the rectangular region. A stack of the core-exposing sections 64 of multiple cathodes 60 is the cathode tab 26. Desirably, the base 66 of the core-exposing section 64 is a dielectric layer or a protective layer that has a higher electrical resistance than the cathode core.

The anode is composed of, for example, an anode core, such as a metal foil, and an anode active material layer on the anode core. The anode core can be, for example, a foil of a metal that does not alloy with lithium at the potentials the anode can have, desirably copper, which is of low cost, high workability, and good electron conductivity, or a film with a layer of such a metal on its surface. The anode active material layer, which contains, for example, an anode active material and other materials such as a binder, is obtained by applying a mixture of the materials in water or any suitable solvent to the anode core, drying the resulting coating, and then rolling the anode core.

The anode active material can be any material capable of storing and releasing alkali metal ions. Examples of anode active materials that can be used include carbon materials, metals, alloys, metal oxides, metal nitrides, and alkali-metal-impregnated carbon and silicon. Examples of carbon materials include natural graphite, artificial graphite, and pitch carbon fiber. Specific examples of metals and alloys include lithium (Li), silicon (Si), tin (Sn), germanium (Ge), indium (In), gallium (Ga), lithium alloys, silicon alloys, and tin alloys. Anode active materials can be used alone, and a combination of two or more can also be used.

The binder can be a material such as a fluoropolymer or a rubber-like polymer as in the cathode, but it is desired to use a material such as a styrene-butadiene copolymer (SBR), which is a rubber-like polymer, or its altered form. The binder may be used in combination with a thickener such as carboxymethyl cellulose (CMC).

A process for the production of the anode can be, for example, as follows. First, an anode slurry is prepared that contains graphite as an anode active material, styrene-butadiene rubber (SBR) as a binder, carboxymethyl cellulose (CMC) as a thickener, and water. The anode slurry is applied to both faces of an anode core having a thickness of, for example, 8 μm, and the applied coating is dried. This gives an anode composed of an anode core and an anode active material layer on each face thereof. The resulting anode is rolled to spread the anode active material layers to a predetermined thickness and then cut into a predetermined shape.

Figure 5B:
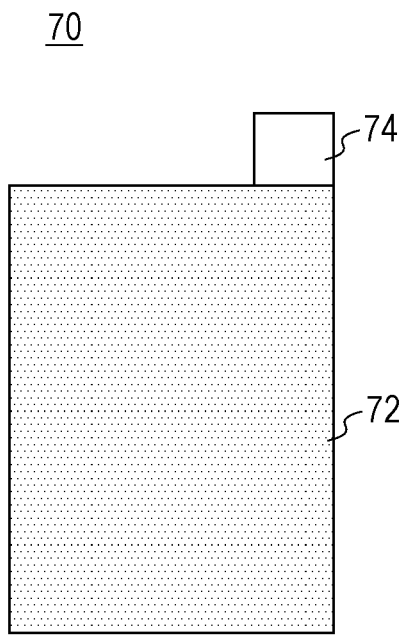
FIG. 5B is a plan view of an anode according to an embodiment.

FIG. 5B is a plan view of an anode 70 that has been cut out. As illustrated in FIG. 5B, the anode 70 has a rectangular region in which an anode active material layer 72 extends on each face of an anode core, with a core-exposing section 74 at one end of a short side of the rectangular region. A stack of the core-exposing sections 74 of multiple anodes 70 is the anode tab 36. Desirably, the anode 70 is slightly larger than the cathode 60 for better acceptance of lithium during charging.

Figure 6:
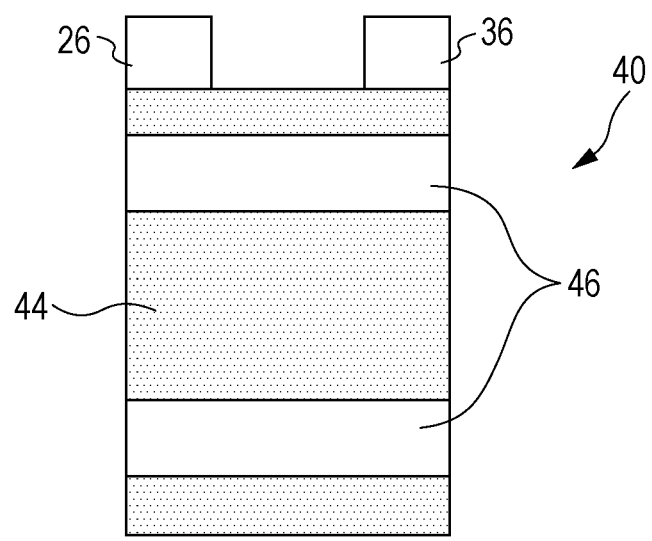
FIG. 6 is a plan view of an electrode body according to an embodiment.

FIG. 6 is a plan view of the electrode body 40. The electrode body 40 is a stack of multiple cathodes 60 and anodes 70 with separators 44 therebetween. When the outermost layers are anodes 70, the electrode body 40 is, for example, a stack of 100 cathodes 60 and 101 anodes 70 with polyolefin separators 44 therebetween. As illustrated in FIG. 6, the electrode body 40 has a cathode tab 26 at one end of a short side of its rectangular shape and an anode tab 36 at the other end. The cathode tab 26 is a stack of the core-exposing sections 64 of the 100 cathodes 60, and the anode tab 36 is a stack of the core-exposing sections 74 of the 101 anodes 70. There is a separator 44 on each face of the electrode body 40.

In the electrode body 40, the stack of cathodes 60, anodes 70, and separators 44 is desirably fastened using, for example, dielectric tape 46. Alternatively, there may be adhesive layers on the separators 44 with which the separators 44 are bonded to the cathodes 60 and the anodes 70. Another possible configuration is one in which the cathodes 60 and the anodes 70 are stacked with each cathode 60 in a bag formed by welding two separators 44 along their edge.

Figure 7:
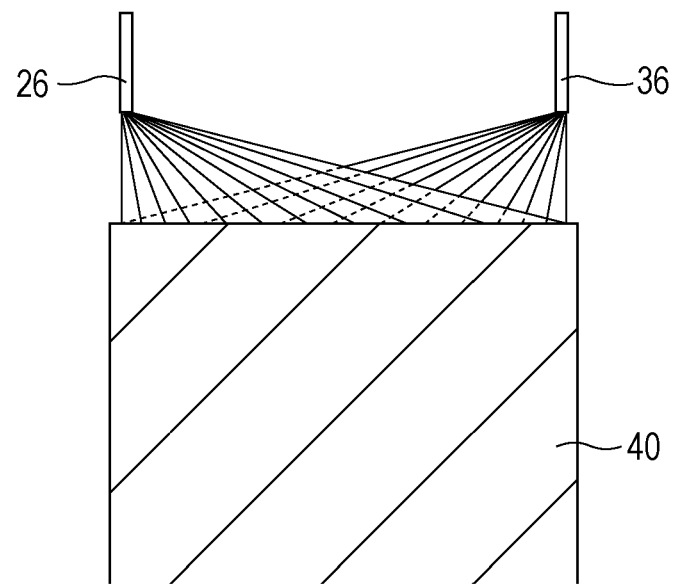
FIG. 7 is a partial side view of an electrode body according to an embodiment.

FIG. 7 is a partial side view of the electrode body 40. As illustrated in FIG. 7, the core-exposing sections 64 of the cathodes 60 may be joined together for the formation of the cathode tab 26 of the electrode body 40. Joining the core-exposing sections 64 of the cathodes 60 beforehand will make it easier to join the cathode tab 26 to the cathode collector lead 28. Like those of the cathodes 60, the core-exposing sections 74 of the anodes 70 may be joined together for the formation of the anode tab 36.

The nonaqueous electrolyte housed in the outer can 12 together with the electrode body 40 can be any kind of liquid electrolyte (electrolytic solution) that is used in nonaqueous electrolyte secondary batteries. The nonaqueous electrolyte may optionally be a solid electrolyte, such as a gel-polymer electrolyte. The nonaqueous electrolyte contains a nonaqueous solvent and an electrolytic salt soluble in the nonaqueous solvent. The nonaqueous solvent can be, for example, a cyclic carbonate, a cyclic carboxylate, a cyclic ether, a linear carbonate, a linear carboxylate, a linear ether, a nitrile, or an amide. More specific examples include ethylene carbonate (EC) and propylene carbonate (PC) as cyclic carbonates, γ-butyrolactone (GBL) as a cyclic carboxylate, and ethyl methyl carbonate (EMC) and dimethyl carbonate (DMC) as linear carbonates. Particularly desired is a mixture of ethylene carbonate (EC), which is a cyclic carbonate and therefore has a high dielectric constant, and ethyl methyl carbonate (EMC), which is a linear carbonate and therefore has low viscosity. Halogenated derivatives of these nonaqueous solvents, which have one or more hydrogen atoms substituted with a halogen atom such as a fluorine atom, can also be used.

The electrolytic salt can be an alkali metal salt. It is more desired that the electrolytic salt be, for example, a lithium salt. Examples of lithium salts that can be used include those commonly used in the known nonaqueous electrolyte secondary batteries, such as $LiPF_6$, $LiBF_4$, and $LiClO_4$. These lithium salts can be used alone, and a combination of two or more can also be used.

The nonaqueous electrolyte secondary battery 10 desirably incorporates an anti-overcharge additive. The battery normally charges and discharges in a predetermined voltage range (e.g., 3.0 V or more and 4.2 V or less), and when the voltage exceeds the upper limit (e.g., 4.2 V) of this range and reaches a predetermined level (e.g., 5.0 V), the anti-overcharge additive decomposes and generates a gas. The gas generated from the anti-overcharge additive activates the CID to prevent charging beyond the predetermined limit. It is desired to use lithium carbonate ($Li_2CO_3$) and cyclohexylbenzene (CHB) as anti-overcharge additives. Lithium carbonate can be added to the cathode active material layer, whereas cyclohexylbenzene can be added to the electrolytic solution.

Figure 8:
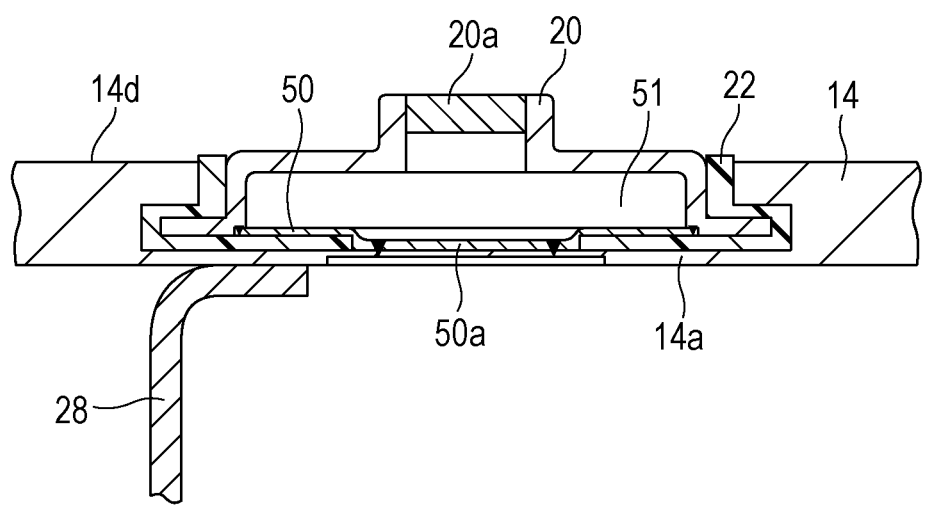
FIG. 8 is an enlarged view of an area around the CID in FIG. 3.
Figure 9:
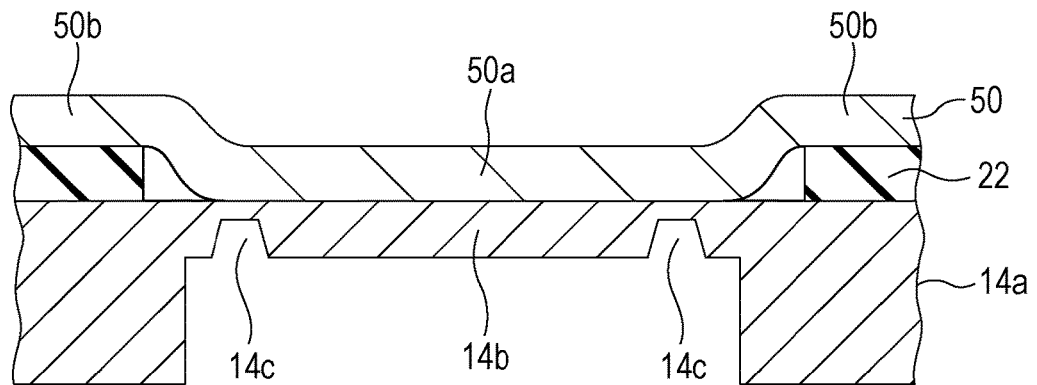
FIG. 9 is an enlarged view of an area around the thin portion of the seal in FIG. 8.

FIG. 8 is an enlarged view of an area around the CID in FIG. 3. FIG. 9 is an enlarged view of an area around the thin portion 14a of the seal plate 14 in FIG. 8. The CID, provided at any point on the electrical conduction pathway between the cathode external terminal 20 and the electrode body 40, interrupts the electrical coupling therebetween in response to an increase in the internal pressure in the battery. The CID includes a thin portion 14a of the seal plate 14 and a diaphragm 50. The diaphragm 50 deforms to interrupt the electrical coupling between the seal plate 14 and the cathode external terminal 20 in response to an increase in the internal pressure in the battery.

The diaphragm 50 is a dish-shaped plate that is positioned between the thin portion 14a of the seal plate 14 and the cathode external terminal 20 and has a flat recess in the middle 50a thereof. The diaphragm 50 is desirably made of a metal that is stable at the potentials of the cathode. For example, it can be made of aluminum or an aluminum alloy. The CID may optionally be on the anode 70 side. In such a case, the diaphragm 50 is positioned to interrupt the electrical coupling between the seal plate 14 and the anode external terminal 30, and it is desired that the diaphragm 50 be made of a metal that does not alloy with lithium at the potentials the anode can have. For example, it can be made of copper.

The seal plate 14 has a space 51 between its outer surface 14d, from which the cathode external terminal 20 on the seal plate 14 projects, and thin portion 14a. This space 51 is capable of housing the diaphragm 50 and at least part of the cathode external terminal 20.

Desirably, at least part of the area of the thin portion 14a of the seal plate 14 where it is contact with the diaphragm 50 has a break portion 14b, which is a portion where the seal plate 14 is even thinner than in the thin portion 14a, as illustrated in FIG. 9. It is also desired that the thin portion 14a of the seal plate 14 have a fragile portion 14c around the break portion 14b. The fragile portion 14c is even thinner than the break portion 14b and therefore is the least resistant to pressure in the seal plate 14. In case of an increased internal pressure in the battery, therefore, the fracture starts at the fragile portion 14c. The break portion 14b remains joined to the middle 50a of the diaphragm 50. A further increase in the internal pressure in the battery makes the diaphragm 50 deform into a convex shape toward the cathode external terminal 20 together with the break portion 14b.

There is a gasket 22 between the round peripheral edge 50b of the diaphragm 50 and the thin portion 14a of the seal plate 14. The CID breaks the fragile portion 14c of the seal plate 14 in response to an increase in the internal temperature in the battery, and deforms the break portion 14b of the seal plate 14 and the diaphragm 50 into a convex shape toward the cathode external terminal 20. Since the gasket 22 between the peripheral edge 50b and the thin portion 14a of the seal plate 14 is an insulator, the electrical coupling between the diaphragm 50 and the seal plate 14 is interrupted.

The seal plate 14 is therefore a component of the CID as well as serving as a lid. In case of an increased internal pressure in the battery, the seal plate 14 works with the diaphragm 50 to interrupt the current by breaking its fragile portion 14c.

The conduction pathway on which the CID is provided can be detailed as follows. The cathode external terminal 20, isolated from the seal plate 14 by the gasket 22, is joined and electrically coupled to the diaphragm 50 at its peripheral edge. The middle 50a of the diaphragm 50 is joined to the break portion 14b of the seal plate 14, and this electrically couples the diaphragm 50 and the seal plate 14. The seal plate 14 is joined and electrically coupled to the cathode collector lead 28. The cathode collector lead 28 is joined and electrically coupled to the electrode body 40. In this way, an electrical conduction pathway is formed between the cathode external terminal 20 and the electrode body 40.

That is, the electrode body 40 and the seal plate 14 are electrically coupled by the cathode collector lead 28, and the diaphragm 50 and the cathode collector lead 28 are connected by the seal plate 14. As a result, a pathway is formed for current to flow from the cathode external terminal 20 to the electrode body 40 via the seal plate 14.

Furthermore, the seal plate 14, to which the cathode collector lead 28 is joined, is joined to the open end of the outer can 12. This electrically couples the outer can 12 to the electrode body 40 via the cathode collector lead 28 and the seal plate 14, forming a circuit for current to flow from the electrode body 40 to the outer can 12.

The formed circuit for current to flow from the electrode body 40 to the outer can 12 directs short-circuit current from the electrode body 40 to the outer can 12 when, for example, an internal short circuit occurs after an event such as perforation of the electrode body 40 with a pointed piece of metal or similar. The Joule heat generated at the point of the short circuit is reduced, and the increase in the temperature of the electrode body 40 is limited. Although an elevated temperature of the electrode body 40 could cause an abrupt increase in battery temperature by driving the cathode active material and the nonaqueous electrolyte to react, the above configuration limits the temperature rise in the electrode body 40, thereby preventing an abrupt increase in battery temperature associated with an elevated temperature of the electrode body 40.

Furthermore, the outer can 12 is joined to the seal plate 14, and the electrode body 40 and the seal plate 14 are electrically coupled by the cathode collector lead 28. As a result, a circuit is formed for heat to conduct from the electrode body 40 to the outer can 12 via the cathode collector lead 28 and the seal plate 14. For example, quick charging increases the temperature of the electrode body 40 for some reasons such as the generation of Joule heat due to ohmic loss. In this situation, the user can limit the temperature rise in the electrode body 40 by cooling the outer can 12 because this cools the electrode body 40 via the seal plate 14 and the cathode collector lead 28.

In the above configuration, it is desired that the cathode collector lead 28 be integrally connected to the seal plate 14. This eliminates the need for a seal lead that a known CID would need to have between the cathode collector lead 28 and the seal plate 14 to enable the diaphragm 50 to deform, thereby allowing the manufacturer to produce CIDs with less components.

The diaphragm 50 is desirably on the cathode external terminal 20 side of the thin portion 14a of the seal plate 14. This allows the manufacturer to integrally connect the cathode collector lead 28 and the seal plate 14 with nothing interfering with placing the cathode collector lead 28 on the electrode body 40 side of the thin portion 14a. This arrangement also ensures that the interruption of current that follows an increase in the internal pressure in the battery only involves the thin portion 14a of the seal plate 14 and the diaphragm 50 thereon. This allows the manufacturer to produce smaller batteries with a thinner CID.

Figure 10:
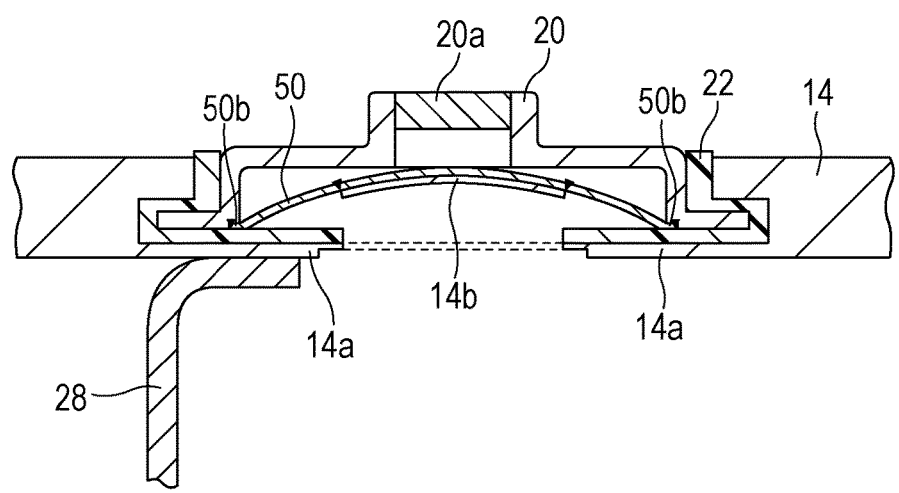
FIG. 10 illustrates the operation of a CID.

The following describes the operation of the CID. The CID operates when, for example, the battery is charged beyond its predetermined range of voltage because of an event during charging such as a malfunction of the charger due to its failure. FIG. 10 illustrates the CID of FIG. 8 in operation.

First, when the nonaqueous electrolyte secondary battery 10 needs to be charged, it starts to charge up to a predetermined upper limit of a voltage range that has been specified beforehand. The battery usually finishes charging when the voltage reaches the predetermined upper limit, but in some cases it may be overcharged, or charged beyond the predetermined upper limit of voltage, because of an event during charging such as a malfunction of the external power supply.

When the voltage exceeds the predetermined upper limit, the nonaqueous solvent in the electrolytic solution decomposes, and a gas is generated. When the voltage further increases and reaches the level at which the anti-overcharge additive decomposes, a gas for activating the CID is generated to stop overcharging, elevating the internal pressure in the battery. Once the internal pressure in the battery has increased, the fragile portion 14c of the seal plate 14 cannot withstand the pressure and fractures.

As the internal pressure in the battery further increases, the diaphragm 50 deforms into the shape of an ark toward the cathode external terminal 20 together with the break portion 14b of the seal plate 14. The diaphragm 50 becomes convex toward the cathode external terminal 20 but remains joined to cathode external terminal 20 at its peripheral edge 50b. At this point, the cathode external terminal 20 is isolated from the seal plate 14 by the gasket 22.

Although the seal plate 14 is electrically coupled to the electrode body 40 by the cathode collector lead 28, the electrical contact between the cathode external terminal 20 and the seal plate 14 has now been lost. As a result, the flow of current between the seal plate 14 and the electrode body 40 is interrupted.

Even if an internal short circuit occurs during an interruption of current like this, the short-circuit current is directed from the electrode body 40 to the outer can 12 because the electrical coupling between the electrode body 40 and the outer can 12 via the cathode collector lead 28 and the seal plate 14 is still alive.

Test Examples

To understand the effectiveness of the circuit for current to flow from the electrode body 40 to the outer can 12 in preventing an abrupt increase in battery temperature after an internal short circuit, an internal short-circuit test was performed in which fully charged batteries were perforated with a pointed piece of metal. The test procedures were as follows. First, the battery was charged to a voltage of 4.2 V at a constant current of 1.0 C (hour rate) at an ambient temperature of 25° C., and then to a current value of 0.05 C at a constant voltage. The pointed tip of a 3-mm-diameter nail was brought into contact with the middle of a lateral face of the battery, i.e., a side extending along the direction of stacking of layers in the electrode body 40, at a battery temperature of 65° C. The nail was driven in the direction perpendicular to the direction of stacking of layers in the electrode body 40 at a velocity of 80 mm/sec until the nail penetrated through the battery. The temperature profile of the perforated battery was evaluated by measuring the battery temperature with a thermocouple placed on the surface of the battery. The battery temperature was measured 10 seconds after perforation.

The test included two batteries, a nonaqueous electrolyte secondary battery 10 (Example 1) according to the above embodiment and a battery 10A (Comparative Example 1). The battery 10A was equivalent to Example 1 in terms of the configuration of the electrolytic solution and the electrode body 40 but was different in that the outer can 12 and the seal plate 14 were not electrically coupled to the electrode body 40 and that the CID had a seal lead like known CIDs.

FIG. 11 illustrates the CID of the battery 10A used as Comparative Example 1. It was a known CID, and its configuration is different from that in Example 1 in that a seal lead 52 is included. As illustrated in FIG. 11, this configuration includes a seal lead 52 that has a cylindrical opening and is joined to the cathode external terminal 20, and a diaphragm 50 that tightly closes the cylindrical opening of the seal lead 52. There is a cathode insulator 24 between the peripheral edge 50b of the diaphragm 50 and the cathode collector lead 28. After the deformation of the diaphragm 50, the diaphragm 50 and the cathode collector lead 28 are electrically separated by this cathode insulator 24. Because of this configuration, the outer can 12 and the seal plate 14 of the battery 10A as Comparative Example 1 were not electrically coupled to the electrode body 40.

The battery temperature was approximately 300° C. for Example 1 and approximately 350° C. for Comparative Example 1. In other words, the temperature of the nonaqueous electrolyte secondary battery 10, Example 1, measured 10 seconds after perforation was lower than that of the battery 10A, Comparative Example 1, by approximately 50° C. This suggests that Example 1, whose outer can 12 and electrode body 40 were electrically coupled, experienced only a limited increase in the temperature of the electrode body 40 and that this prevented an abrupt increase in battery temperature associated with an elevated temperature of the electrode body 40.

In the above embodiment, a circuit is formed for current to flow from the electrode body 40 to the outer can 12. The circuit limits the increase in the temperature of the electrode body 40 and, as a result, prevents an abrupt increase in battery temperature associated with an elevated temperature of the electrode body 40. Unlike known CIDs, furthermore, the CID has no seal lead. This allows the manufacturer to produce smaller batteries with a thinner CID.

The nonaqueous electrolyte secondary batteries according to the present disclosure are not limited to the above embodiment. They have, for example, the configurations according to the following items.

Item 1

A nonaqueous electrolyte secondary battery including: a conductive outer can, an electrode body in the outer can, a conductive seal plate tightly closing an open end of the outer can, and an external terminal on the seal plate; and a current cutoff mechanism that is located at any point on an electrical conduction pathway between the external terminal and the electrode body and interrupts electrical coupling therebetween in response to an increase in an internal pressure in the battery, the current cutoff mechanism including a thin portion of the seal plate and a diaphragm that deforms to interrupt the electrical coupling between the external terminal and the electrode body in response to the increase in the internal pressure in the battery, the electrode body and the seal plate electrically coupled by a collector lead, and the diaphragm and the collector lead connected by the seal plate.

Item 2

The nonaqueous electrolyte secondary battery according to item 1, wherein the collector lead is integrally connected to the seal plate.

Item 3

The nonaqueous electrolyte secondary battery according to item 1 or 2, wherein the diaphragm is on an external terminal side of the thin portion of the seal plate.

What is claimed is:

1. A nonaqueous electrolyte secondary battery comprising: a conductive outer case, an electrode body in the outer cane, a conductive seal plate closing an open end of the outer can, and an external terminal on the seal plate; and a current cutoff mechanism that is located on an electrical conduction pathway between the external terminal and the electrode body, the current cutoff mechanism cutting off electrical connection between the external terminal and the electrode body in response to an increase in an internal pressure in the battery, wherein the current cutoff mechanism including a thin portion of the seal plate and a diaphragm that deforms to cut off the electrical connection between the external terminal and the electrode body in response to the increase in the internal pressure in the battery, the electrode body and the seal plate electrically connected by a collector lead, and the diaphragm and the collector lead connected by the seal plate, and the seal plate directly contacts the outer can.

2. The nonaqueous electrolyte secondary battery according to claim 1, wherein the collector lead and the seal plate are integrally constituted.

3. The nonaqueous electrolyte secondary battery according to claim 1, wherein the diaphragm is on an external terminal side of the thin portion of the seal plate.

4. The nonaqueous electrolyte secondary battery according to claim 1, wherein the collector lead directly contacts the seal plate.

* * * * *